United States Patent
Imaoka

(10) Patent No.: US 8,009,365 B2
(45) Date of Patent: Aug. 30, 2011

(54) PROJECTION OPTICAL SYSTEM

(75) Inventor: Masayuki Imaoka, Izumiotsu (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 0 days.

(21) Appl. No.: 12/792,971

(22) Filed: Jun. 3, 2010

(65) Prior Publication Data

US 2010/0315721 A1    Dec. 16, 2010

(30) Foreign Application Priority Data

Jun. 12, 2009 (JP) ................. 2009-140843

(51) Int. Cl.
G02B 13/22 (2006.01)
G02B 3/00 (2006.01)
G02B 9/00 (2006.01)

(52) U.S. Cl. ........ 359/663; 359/649

(58) Field of Classification Search ........ 359/649, 359/651, 663, 690
See application file for complete search history.

(56) References Cited

U.S. PATENT DOCUMENTS 5,159,496 A    10/1992 Kataoka ............ 359/754
5,905,596 A *  5/1999 Watanabe .......... 359/663

FOREIGN PATENT DOCUMENTS

JP    2002-14281 A    1/2002
JP    2004-354805 A   12/2004

* cited by examiner

*Primary Examiner* — Alicia M Harrington
(74) *Attorney, Agent, or Firm* — Sidley Austin LLP

(57) ABSTRACT

The projection optical system uses a plurality of wavelengths or a wavelength band within a wavelength range from a visible region to a near ultraviolet region. The double-telecentric projection optical system includes: a first lens group with a positive power; a second lens group with a negative power, including a predetermined lens or lenses; and a third lens group with a positive power, including a stop and at least two positive lenses satisfying a predetermined condition relating to refractive index. The projection optical system satisfies a predetermined condition relating to a composite focal length of the first lens group and the second lens group, and a focal length of the third lens group.

20 Claims, 12 Drawing Sheets

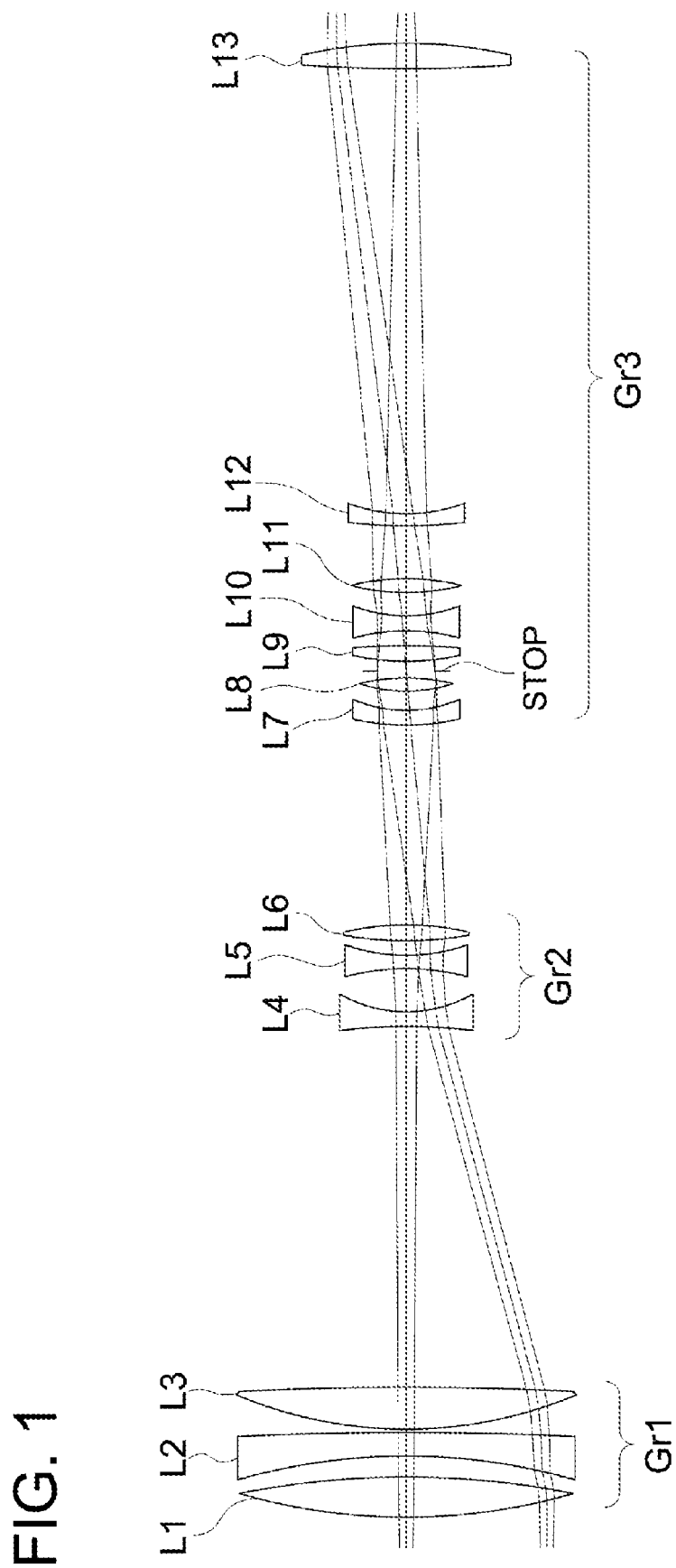

SPHERICAL ABERRATION

ASTIGMATISM (g-LINE)

ASTIGMATISM (h-LINE)

ASTIGMATISM (i-LINE)

DISTORTION (h-LINE)

CHROMATIC ABERRATION OF MAGNIFICATION

SPHERICAL ABERRATION

ASTIGMATISM (g-LINE)

ASTIGMATISM (h-LINE)

ASTIGMATISM (i-LINE)

DISTORTION (h-LINE)

CHROMATIC ABERRATION OF MAGNIFICATION

SPHERICAL ABERRATION

ASTIGMATISM (g-LINE)

ASTIGMATISM (h-LINE)

ASTIGMATISM (i-LINE)

DISTORTION (h-LINE)

CHROMATIC ABERRATION OF MAGNIFICATION

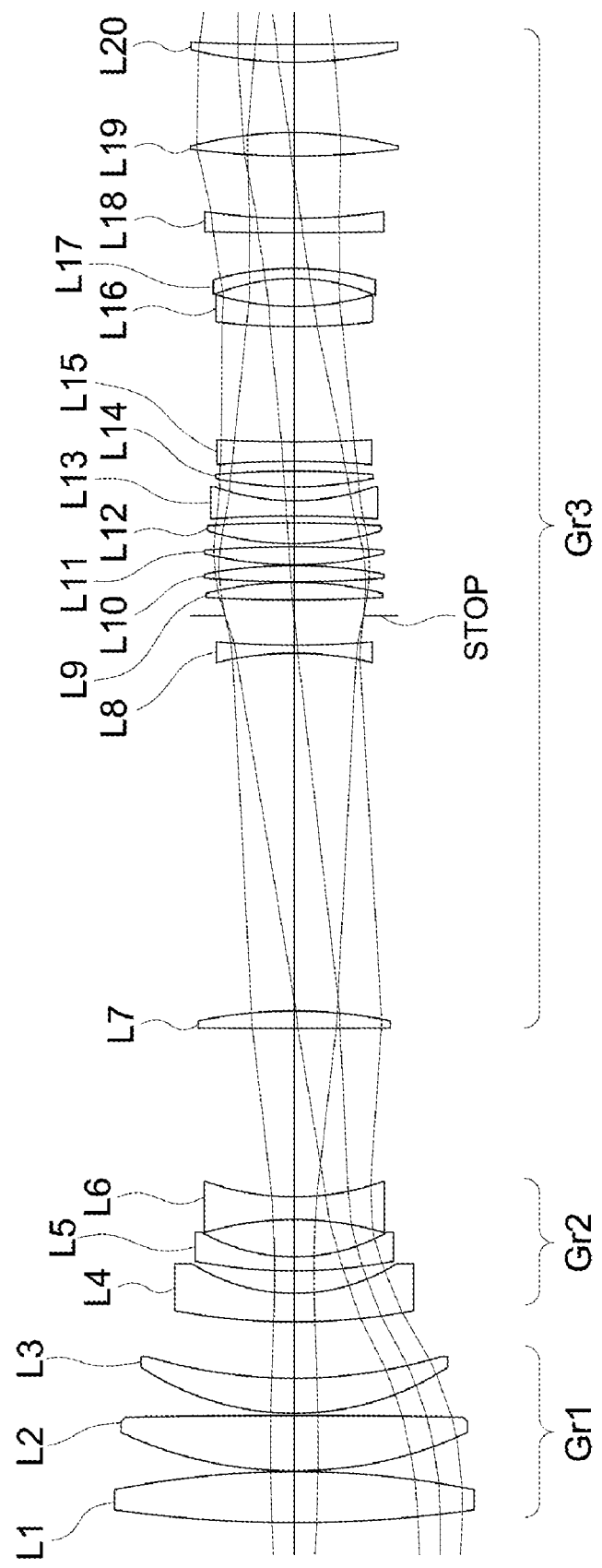

SPHERICAL ABERRATION

ASTIGMATISM (g-LINE)

ASTIGMATISM (h-LINE)

ASTIGMATISM (i-LINE)

DISTORTION (h-LINE)

CHROMATIC ABERRATION OF MAGNIFICATION

PROJECTION OPTICAL SYSTEM

This application is based on Japanese Patent Application No. 2009-140843 filed on Jun. 12, 2009, in Japanese Patent Office, the entire content of which is hereby incorporated by reference.

TECHNICAL FIELD

The present invention relates to a projection optical system with a double telecentricity in which a principal ray is almost parallel with the optical axis at both of the incident side and the outgoing side of the optical system.

BACKGROUND

In a double-telecentric optical system, its magnification almost does not change even when the optical system shifts in the optical axis direction compared with an object plane or an image plane. Therefore, a double-telecentric projection optical system is preferably used in a situation that such the characteristic is required. For example, when a double-telecentric optical system is used as a projection optical system, it can reduce an influence of a distortion caused by a displacement of the focal position and an influence of a warp of the object plane and the image plane (projection plane). When it is used as an inspection optical system, it enables precise inspection by providing deep depth of field even if an object has an uneven surface, and further enables to avoid a positioning error of an imaging element such as CCD.

As such the projection optical system, there has been known an achromatic lens system achromatized for g-line, h-line and i-line (for example, U.S. Pat. No. 5,159,496). The lens system includes a stop, a front lens system arranged at the front of the stop, and a rear lens system arranged at the rear of the stop. In the lens system, two meniscus lenses with negative power whose concave surfaces face the stop, are arranged in each of the front lens system and the rear lens system. Further, there has been known a double-telecentric projection optical system with a magnification of about 1× which is achromatized for g-line, h-line and i-line, and includes a front lens group and a rear lens group arranged to be almost symmetrical about a pupil plane (for example, JP-A No. 2002-14281). There has further been known a double-telecentric optical system with a magnification of about 3× at the enlargement side (for example, JP-A No. 2004-354805).

In view of various uses for a double-telecentric projection optical system, a double-telecentric projection optical system preferably uses a plural wavelength bands at the same time or uses one of the plural wavelength bands while the wavelength band are changed at need. At this case, the projection optical system is needed to be achromatized for the plural wavelength bands to be used.

However, in the achromatic lens system described in U.S. Pat. No. 5,159,496, longitudinal chromatic aberration is insufficiently corrected, which results in a unsatisfactory property. The double-telecentric projection optical system described in JP-A No. 2002-14281 has a problem in its large chromatic aberration. The double-telecentric optical system described in JP-A No. 2004-354805 has a sufficient property for a single wavelength but has a slight difficulty as an optical system using plural wavelengths.

SUMMARY

A double-telecentric projection optical system as an embodiment of the present invention is a double-telecentric projection optical system comprising, in order from a enlargement side: a first lens group with a positive power, including a first lens arranged at a closest position to the enlargement side in the projection optical system; a second lens group with a negative power, including a lens or lenses which start with a negative lens that is a first negative lens to satisfy $|Hn/Y|<0.75$ from the enlargement side in the projection optical system, and which end with a lens that is the first to satisfy $Ln/L1a>0.15$ from the enlargement side among the negative lens and lenses at the rear of the negative lens in the projection optical system; and a third lens group with a positive power, including a stop and lenses at the rear of the second lens group. The lenses in the third lens group include at least two positive lenses satisfying $0.662<0.00055 \times vh+P$. The projection optical system uses a plurality of wavelengths or a wavelength band covering a predetermined range each of which is within a wavelength range from a visible region to a near ultraviolet region. The projection optical system satisfies the following expression.

$$1<|f12/f3|<5 \qquad (1)$$

Herein, Hn is a height (mm) of an outermost off-axis principal ray, measured from an optical axis when the outermost off-axis principal ray passes through an enlargement-side surface of an n-th lens, Y is a maximum image height (mm) at the enlargement side, Ln is a distance of an air space between an n-th lens and an (n+1)-th lens, L1a is a distance from an apex of an enlargement-side surface of the first lens to a surface of the stop, vh is defined as $(Nh-1)/(Ni-Ng)$, P is defined as $P=(Ni-Nh)/(Ni-Ng)$, Nh is a refractive index at h-line, Ni is a refractive index at i-line, Ng is a refractive index at g-line, f12 is a composite focal length (mm) of the first lens group and the second lens group, and f3 is a focal length (mm) of the third lens group, where each of the n-th lens for Hn and Ln is an n-th lens to be arranged from the enlargement side in the projection optical system and each n is independently an integer of one or more.

These and other objects, features and advantages according to the present invention will become more apparent upon reading of the following detailed description along with the accompanied drawings.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which:

FIG. 1 is a cross sectional view showing a structure of a double-telecentric projection optical system of Example 1;

FIG. 10 is a cross sectional view showing a structure of a double-telecentric projection optical system of Example 4;

DESCRIPTION OF THE PREFERRED EMBODIMENT

Figure 2A:
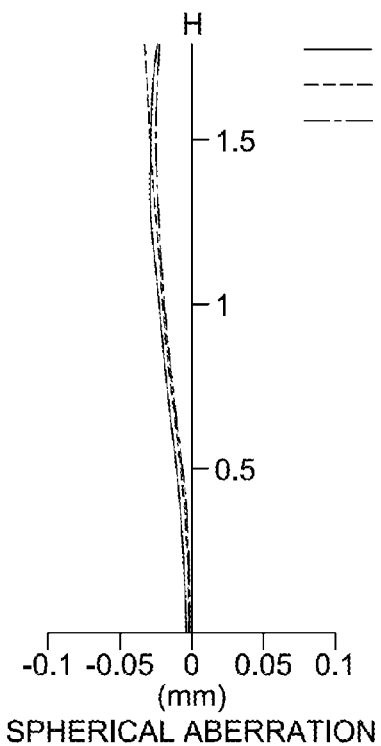
FIGS. 2a to 2d are drawings showing spherical aberration and astigmatism of the projection optical system of Example 1.

Hereafter, although embodiments of the present invention will be described in details, the present invention is not limited to the embodiments.

One embodiment of the present invention is a projection optical system with a double telecentricity which uses a plurality of wavelengths or a wavelength band covering a predetermined range each of which is within a wavelength range from a visible region to a near ultraviolet region. The projection optical system with a double telecentricity comprises, in order from a enlargement side to a reducing side: a first lens group with a positive power, including a first lens arranged at a closest position to the enlargement side in the projection optical system; a second lens group with a negative power, including a lens or lenses which start with a negative lens that is a first negative lens to satisfy $|Hn/Y|<0.75$ from the enlargement side in the projection optical system, and which end with a lens that is the first to satisfy $Ln/L1a>0.15$ from the enlargement side among the negative lens and lenses at the rear of the negative lens in the projection optical system; and a third lens group with a positive power, including a stop and lenses at the rear of the second lens group, where the lenses in the third lens group include at least two positive lenses satisfying $0.662<0.00055\times vh+P$. The projection optical system satisfies the following expression (1).

$$1<|f12/f3|<5 \quad (1)$$

Herein, $Hn$ is a height (mm) of an outermost off-axis principal ray, measured from an optical axis when the outermost off-axis principal ray passes through an enlargement-side surface of an n-th lens, $Y$ is a maximum image height (mm) at the enlargement side, $Ln$ is a distance of an air space between an n-th lens and an (n+1)-th lens, $L1a$ is a distance from an apex of an enlargement-side surface of the first lens to a surface of the stop, $vh$ is defined as $(Nh-1)/(Ni-Ng)$, $P$ is defined as $P=(Ni-Nh)/(Ni-Ng)$, $Nh$ is a refractive index at h-line, $Ni$ is a refractive index at i-line, $Ng$ is a refractive index at g-line, $f12$ is a composite focal length (mm) of the first lens group and the second lens group, and $f3$ is a focal length (mm) of the third lens group.

In these definition, each of the n-th lens for $Hn$ and $Ln$ is an n-th lens to be arranged from the enlargement side in the projection optical system and each n is independently an integer of one or more.

The term "enlargement side" represents a side of the projection optical system at which an outermost off-axis principal my is higher than that at the other side, between both sides of the projection optical system. The term "reduction side" represents a side of the projection optical system at which an outermost off-axis principal ray is lower than that at the other, between the both sides of the projection optical system.

The term "double-telecentricity" represents a condition that each of the outermost off-axis principal rays at the both sides of the projection optical system forms an angle of 2° or less with the optical axis.

Such the lens-group construction exhibits an efficiently corrected chromatic aberration with maintaining a telecentricity. When the projection optical system employs a plurality of the above positive lenses, the secondary spectrum can be reduced efficiently, and chromatic aberration, especially a longitudinal chromatic aberration can be sufficiently corrected. When the projection optical system satisfies the above expression (1) relating to a focal length, aberrations, especially a spherical aberration can be corrected, while the telecentricity and a desired projection magnification are sufficiently maintained. Since the projection optical system employs a double-telecentric system, rays travel the optical system smoothly and occurrence of aberrations can be minimized.

When a value of the expression (1) is less than the lower limit, the projection optical system easily diverges rays excessively under a projection with a desired projection magnification, which makes maintaining telecentricity difficult. When the value of the expression (1) exceeds the upper limit, the projection optical system easily converges rays excessively under a projection with a desired projection magnification, which makes maintaining telecentricity difficult, too.

As for the above conditional expression, the following range is preferable.

$$1.5<|f12/f3|<4.5 \quad (1')$$

The double-telecentric projection optical system preferably satisfies the following expression.

$$0.04<|f1/f12|<0.6 \quad (2)$$

In the expression, $f1$ is a focal length (mm) of the first lens group.

By forming the first lens group so as to satisfy the expression (2), the telecentricity is easily ensured.

When a value of the expression (2) is lower than the upper limit, the telecentricity can be easily maintained, because the first lens group does not have an excessively weak power. When the value of the expression (2) exceeds the lower limit, curvature of field is sufficiently corrected, because the first lens group does not have an excessively strong power.

As for the above conditional expression, the following range is preferable.

$$0.05<|f1/f12|<0.5 \quad (2')$$

The double-telecentric projection optical system preferably satisfies the following expression.

$$0.01<|f2/f12|<0.5 \quad (3)$$

In the expression, $f2$ is a focal length (mm) of the second lens group.

By providing strong negative power for the first lens group so as to satisfy the expression (3), Petzval sum can be reduced with maintaining a sufficient telecentricity. Therefore, curvature of field can be reduced.

When a value of the expression (3) is lower than the upper limit, curvature of field can be sufficiently corrected, because the second lens group does not have an excessively weak power. When the value of the expression (3) exceeds the lower limit, desired projection magnification can be maintained, because composite power of the first lens group and the second lens group does not become excessively weak.

As for the above conditional expression, the following range is preferable.

$$0.02 < |f2/f12| < 0.4 \quad (3')$$

The double-telecentric projection optical system preferably satisfies the following expression.

$$0.25 < |f2/f1| < 0.8 \quad (4)$$

By providing strong negative power for the second lens group so as to satisfy the expression (4), Petzval sum can be reduced with maintaining a sufficient telecentricity. Therefore, curvature of field can be reduced.

When a value of the expression (4) is lower than the upper limit, curvature of field can be sufficiently corrected, because the second lens group does not have an excessively weak power. When the value of the expression (4) exceeds the lower limit, the telecentricity can be easily maintained, because the first lens group does not have an excessively weak power.

As for the above conditional expression, the following range is preferable.

$$0.3 < |f2/f1| < 0.75 \quad (4')$$

In the double-telecentric projection optical system, it is preferable that each of the at least two positive lenses satisfying $0.662 < 0.00055 \times vh + P$ in the third lens group satisfies the following expression.

$$|Hn_{min}/Y| < 0.3 \quad (5)$$

In the expression, $Hn_{min}$ is smaller one (mm) of a height of an outermost off-axis principal ray measured when the outermost off-axis principal ray passes through an enlargement-side surface of each of the at least two positive lenses and a height of an outermost off-axis principal ray measured when the outermost off-axis principal ray passes a reduction-side surface of each of the at least two positive lenses.

By arranging the positive lenses satisfying $|Hn_{min}/Y| < 0.3$ at a position where the principal ray passes lower position so as to satisfy the expression (5), longitudinal chromatic aberration can be corrected more efficiently.

As for the above conditional expression, the following range is preferable.

$$|Hn_{min}/Y| < 0.25 \quad (5')$$

In the double-telecentric projection optical system, it is preferable that the third lens group includes at least three positive lenses and at least two negative lenses. This structure allows the double-telecentric projection to correct longitudinal chromatic aberration more efficiently with maintaining a telecentricity.

In the double-telecentric projection optical system, it is preferable that the first lens arranged at the closest position to the enlargement side in the first lens group is a biconvex positive lens. This structure allows the double-telecentric projection to maintain a telecentricity easily.

In the double-telecentric projection optical system, it is preferable that the first lens group includes at least two positive lenses. This structure allows the double-telecentric projection to maintain a telecentricity easily, although the total dimension of the optical system is short.

In the double-telecentric projection optical system, it is preferable that the first lens includes a positive lens, a negative lens, a positive lens which are arranged in order from the enlargement side. This structure allows the double-telecentric projection to maintain a telecentricity easily and to correct distortion effectively.

The double-telecentric projection optical system preferably satisfies the following expression.

$$0.1 < LB/TL < 0.5 \quad (6)$$

In the expression, LB is a backside length of the projection optical system at a reduction side and TL is a total length of the projection optical system.

When a value of the expression (6) is lower than the upper limit, various aberrations can be properly corrected, because the backside length at a reduction side of the projection optical system does not become excessively long. Further, the total size of the optical system does become large. When the value of the expression (6) exceeds the lower limit, members such as a lens-holding member do not interfere with the projection optical system.

As for the above conditional expression, the following range is preferable.

$$0.1 < LB/TL < 0.4 \quad (6')$$

EXAMPLES

Examples of the double-telecentric projection optical system relating to the above embodiment will be described below.

In the examples, the following symbols are used. In the following descriptions, an "n-th lens" means the n-th lens to be arranged from the enlargement side in a projection optical system, where each n is independently an integer of one or more.

i: Surface number

R: Curvature radius (mm)

d: Axial distance of surfaces (mm)

H: Height (mm) of an outermost off-axis principal ray, measured from an optical axis when the outermost off-axis principal ray passes through an n-th lens Hn: Height (mm) of an outermost off-axis principal ray, measured from an optical axis when the outermost off-axis principal ray passes through an enlargement-side surface of an n-th lens Y: Maximum image height (mm) at the enlargement side Ln: Distance of an air space between an n-th lens and an (n+1)-th L1a: Distance from an apex of an enlargement-side surface of the first lens to a surface of the stop $vh = (Nh-1)/(Ni-Ng)$ $P = (Ni-Nh)/(Ni-Ng)$ Ni: Refractive index at i-line (365 nm)

Nh: Refractive index at h-line (405 nm)

Ng: Refractive index at g-line (436 nm)

f12: Composite focal length (mm) of the first lens group and the second lens group f1: Focal length (mm) of the first lens group f2: Focal length (mm) of the second lens group f3: Focal length (mm) of the third lens group LB: Backside length of the projection optical system at the reduction side TL: Total length of the projection optical system $Hn_{min}$: Smaller one (mm) of a height of an outermost off-axis principal ray measured when the outermost off-axis principal ray passes through an enlargement-side surface of an n-th lens and a height of an outermost off-axis principal ray measured when the outermost off-axis principal ray passes a reduction-side surface of the n-th lens Example 1

Example 1 will be described below.
Table 1 shows lens-surface data of the projection optical system of Example 1.

TABLE 1

| i | R | d | Ni | Nh | Ng | vh | P | H |
|---|---|---|---|---|---|---|---|---|
| 0 | Object or Image plane | | | | | | | |
| | | 51.490 | | | | | | |
| 1 | 101.069 | | | | | | | 15.00 |
| | | 5.395 | 1.636137 | 1.622592 | 1.615047 | 29.5 | 0.642 | |
| 2 | −327.642 | | | | | | | 14.77 |
| | | 95.224 | | | | | | |
| 3 | −35.405 | | | | | | | 3.11 |
| | | 2.594 | 1.636137 | 1.622592 | 1.615047 | 29.5 | 0.642 | |
| 4 | −101.451 | | | | | | | 3.00 |
| | | 11.252 | | | | | | |
| 5 | 47.870 | | | | | | | 2.04 |
| | | 3.005 | 1.449860 | 1.446451 | 1.444423 | 82.1 | 0.627 | |
| 6 | −46.719 | | | | | | | 1.83 |
| | | 4.966 | | | | | | |
| 7 | −32.339 | | | | | | | 1.22 |
| | | 3.192 | 1.535785 | 1.529768 | 1.526214 | 55.4 | 0.629 | |
| 8 | 40.970 | | | | | | | 1.01 |
| | | 3.223 | | | | | | |
| 9 | 136.729 | | | | | | | 0.72 |
| | | 3.317 | 1.449860 | 1.446451 | 1.444423 | 82.1 | 0.627 | |
| 10 | −50.706 | | | | | | | 0.52 |
| | | 2.079 | | | | | | |
| 11 | Stop | | | | | | | 0.32 |
| | | 1.467 | | | | | | |
| 12 | 40.673 | | | | | | | 0.18 |
| | | 2.825 | 1.449860 | 1.446451 | 1.444423 | 82.1 | 0.627 | |
| 13 | −32.111 | | | | | | | 0.01 |
| | | 4.104 | | | | | | |
| 14 | −29.234 | | | | | | | 0.41 |
| | | 3.170 | 1.535785 | 1.529768 | 1.526214 | 55.4 | 0.629 | |
| 15 | −51.005 | | | | | | | 0.62 |
| | | 42.731 | | | | | | |
| 16 | 57.655 | | | | | | | 4.83 |
| | | 3.372 | 1.636137 | 1.622592 | 1.615047 | 29.5 | 0.642 | |
| 17 | −78.648 | | | | | | | 4.92 |
| | | 3.156 | | | | | | |
| 18 | −38.448 | | | | | | | 4.93 |
| | | 2.838 | 1.504063 | 1.498983 | 1.495964 | 61.6 | 0.627 | |
| 19 | 50.668 | | | | | | | 5.09 |
| | | 9.220 | | | | | | |
| 20 | −28.426 | | | | | | | 6.11 |
| | | 3.137 | 1.504063 | 1.498983 | 1.495964 | 61.6 | 0.627 | |
| 21 | 113.361 | | | | | | | 6.73 |
| | | 77.168 | | | | | | |
| 22 | 705.694 | | | | | | | 27.54 |
| | | 8.956 | 1.504063 | 1.498983 | 1.495964 | 61.6 | 0.627 | |
| 23 | −93.561 | | | | | | | 28.20 |
| | | 0.650 | | | | | | |
| 24 | 691.691 | | | | | | | 28.69 |
| | | 5.098 | 1.636137 | 1.622592 | 1.615047 | 29.5 | 0.642 | |
| 25 | 130.000 | | | | | | | 28.98 |
| | | 4.489 | | | | | | |
| 26 | 182.778 | | | | | | | 29.75 |
| | | 8.593 | 1.511760 | 1.507205 | 1.504507 | 69.9 | 0.628 | |
| 27 | −128.267 | | | | | | | 29.96 |
| | | 76.870 | | | | | | |
| 28 | Object or Image plane | | | | | | | 30.00 |

FIG. 1 is a cross sectional view showing a structure of the double-telecentric projection optical system of Example 1.

As shown in FIG. 1, the projection optical system of Example 1 has a 13-element structure. In Table 1, lens surfaces numbered 27 and 26 as surface number i represent the first lens L1 arranged at the closest position to the enlargement side. Lens surfaces numbered 2 and 1 as surface number i represent the thirteenth lens L13 arranged at the closest position to the reducing side.

In Example 1, the maximum image height Y at the enlargement side is 30.00. A first negative lens to satisfy |Hn/Y|<0.75 from the enlargement side in the projection optical lens is the fourth lens L4. Distance L1a from an apex of the enlargement-side surface of the first lens L1 to the surface of the stop is 180.975. A first lens to satisfy Ln/L1a>0.15 from the enlargement side among lenses from the forth lens L4 to the lens closest to the reducing side, is the sixth lens L6.

In other words, as shown in FIG. 1, there are arranged, in order from the enlargement side to the reducing side, first lens group including the first lens L1 through the third lens L3, second lens group Gr2 including the fourth lens L4 through the sixth lens L6, and third lens group Gr3 including the seventh lens L7 through the thirteenth lens L13.

In third group Gr3, positive lenses satisfying 0.662<0.00055×vh+P are three lenses of the eighth lens L8, the ninth lens L9 and the eleventh lens L11.

Table 2 shows values of $Hn_{min}$ and $Hn_{min}/Y$ of the eighth lens L8, the ninth lens L9 and the eleventh lens L11 which are positive lenses satisfying 0.662<0.00055×vh+P in third group Gr3 of Example 1.

TABLE 2

|  | $Hn_{min}$ | $Hn_{min}/Y$ |
| --- | --- | --- |
| Eighth lens | 0.01 | 0.0003 |
| Ninth lens | 0.52 | 0.0173 |
| Eleventh lens | 1.83 | 0.0610 |

As can be seen from Table 2, these lenses satisfy the expression (5): $|Hn_{min}/Y|<0.3$.

Figure 2B:
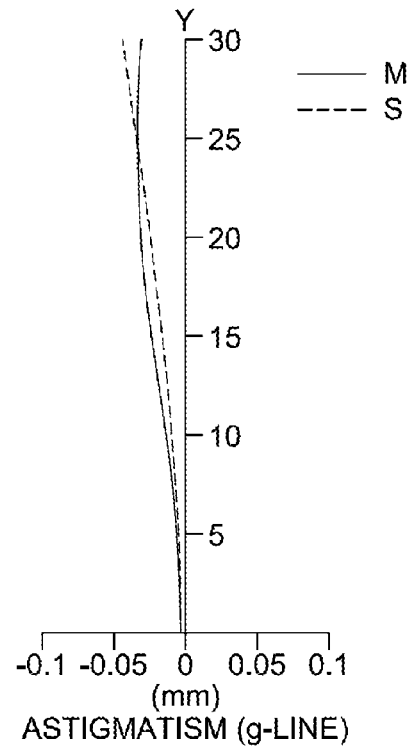
Figure 2C:
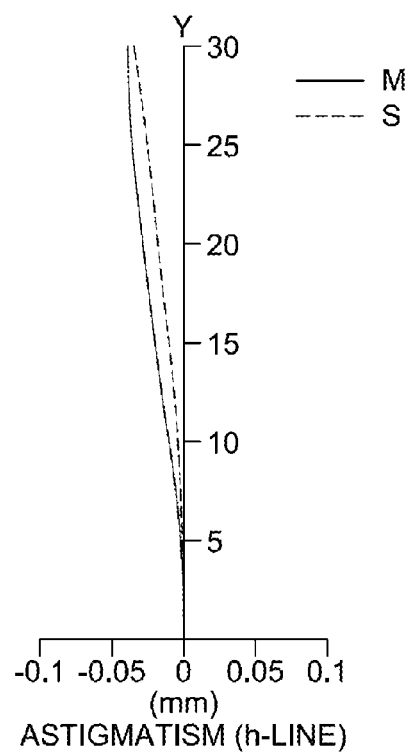
Figure 2D:
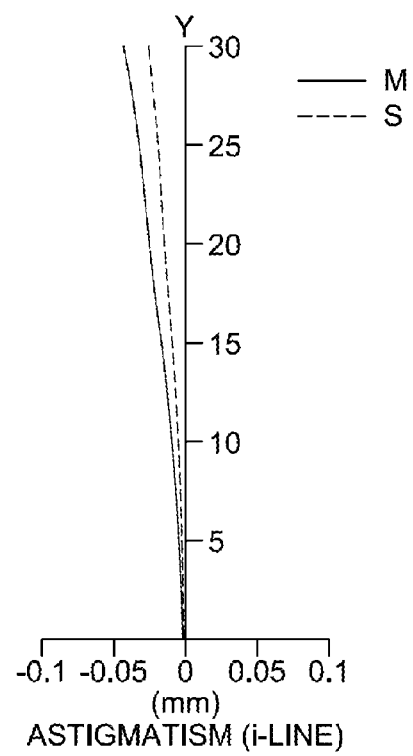

FIGS. 2a to 2d are drawings showing spherical aberration and astigmatism of the projection optical system of Example 1. In FIG. 2a, a solid line represents spherical aberration at g-line is, a dashed line represents spherical aberration at i-line, and an alternate long and short dash line represents spherical aberration at h-line. FIG. 2b shows astigmatism at g-line, FIG. 2c shows astigmatism at h-line, and FIG. 2d shows astigmatism at i-line. In the astigmatism diagrams, a solid line represents astigmatism on a meridional image plane, and a dashed line represents astigmatism on a saggital image plane.

Figure 3A:
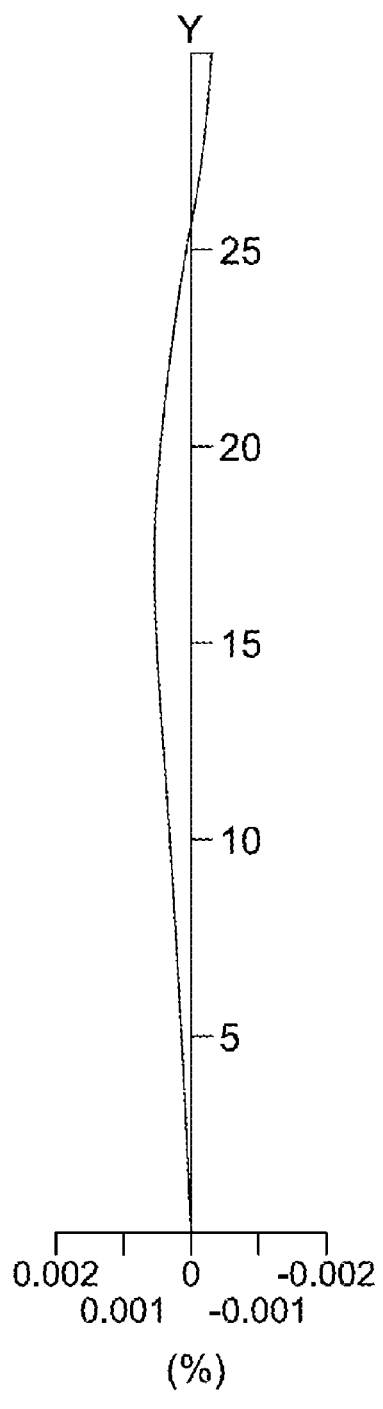
FIGS. 3a and 3b are drawings showing distortion and chromatic aberration of magnification of the projection optical system of Example 1.
Figure 3B:
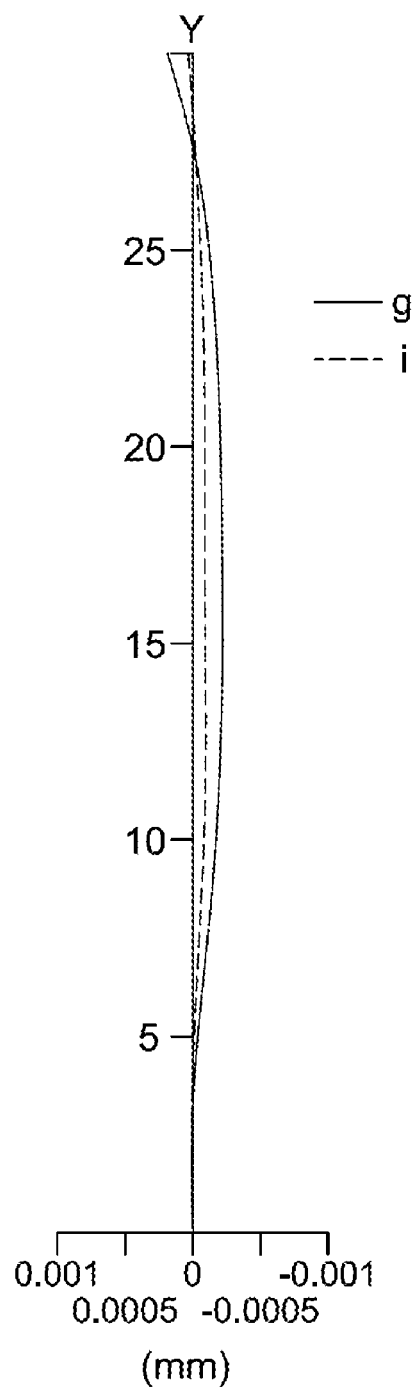

FIGS. 3a and 3b are drawings showing distortion and chromatic aberration of magnification of the projection optical system of Example 1. FIG. 3a shows distortion at h-line. In the diagram showing chromatic aberration of magnification, a solid line represents the chromatic aberration at g-line, and a dashed line represents the chromatic aberration at i-line.

Example 2

Example 2 will be described below.

Table 3 shows lens-surface data of the projection optical system of Example 2.

TABLE 3

| i | R | d | Ni | Nh | Ng | vh | P | H |
| --- | --- | --- | --- | --- | --- | --- | --- | --- |
| 0 | Object or Image plane | | | | | | | |
| | | 66.200 | | | | | | |
| 1 | 245.031 | | | | | | | 20.00 |
| | | 5.202 | 1.636658 | 1.622941 | 1.615298 | 29.2 | 0.642 | |
| 2 | −179.327 | | | | | | | 19.90 |
| | | 78.371 | | | | | | |
| 3 | −75.265 | | | | | | | 10.28 |
| | | 4.257 | 1.636658 | 1.622941 | 1.615298 | 29.2 | 0.642 | |
| 4 | −147.618 | | | | | | | 10.18 |
| | | 0.860 | | | | | | |
| 5 | 138.208 | | | | | | | 10.06 |
| | | 4.283 | 1.636658 | 1.622941 | 1.615298 | 29.2 | 0.642 | |
| 6 | −240.639 | | | | | | | 9.77 |
| | | 0.860 | | | | | | |
| 7 | 105.412 | | | | | | | 9.55 |
| | | 4.175 | 1.535785 | 1.529768 | 1.526214 | 55.4 | 0.629 | |
| 8 | 46.916 | | | | | | | 8.95 |
| | | 32.863 | | | | | | |
| 9 | −43.820 | | | | | | | 5.93 |
| | | 3.826 | 1.559693 | 1.550656 | 1.545503 | 38.8 | 0.637 | |
| 10 | 5557.109 | | | | | | | 5.88 |
| | | 1.901 | | | | | | |
| 11 | 96.365 | | | | | | | 5.84 |
| | | 6.252 | 1.449860 | 1.446451 | 1.444423 | 82.1 | 0.627 | |
| 12 | −53.333 | | | | | | | 5.66 |
| | | 3.679 | | | | | | |
| 13 | −49.540 | | | | | | | 5.31 |
| | | 3.011 | 1.535785 | 1.529768 | 1.526214 | 55.4 | 0.629 | |
| 14 | 133.388 | | | | | | | 5.23 |
| | | 4.785 | | | | | | |
| 15 | −3314.774 | | | | | | | 5.15 |
| | | 4.902 | 1.449860 | 1.446451 | 1.444423 | 82.1 | 0.627 | |
| 16 | −56.522 | | | | | | | 5.10 |
| | | 0.860 | | | | | | |
| 17 | 229.240 | | | | | | | 5.04 |
| | | 4.411 | 1.449860 | 1.446451 | 1.444423 | 82.1 | 0.627 | |
| 18 | −95.061 | | | | | | | 4.85 |
| | | 0.860 | | | | | | |
| 19 | 76.624 | | | | | | | 4.75 |
| | | 5.036 | 1.449860 | 1.446451 | 1.444423 | 82.1 | 0.627 | |
| 20 | −173.093 | | | | | | | 4.36 |
| | | 10.701 | | | | | | |
| 21 | 73.327 | | | | | | | 2.97 |
| | | 4.581 | 1.449860 | 1.446451 | 1.444423 | 82.1 | 0.627 | |
| 22 | −401.582 | | | | | | | 2.52 |
| | | 10.226 | | | | | | |
| 23 | −120.595 | | | | | | | 0.98 |
| | | 3.664 | 1.535785 | 1.529768 | 1.526214 | 55.4 | 0.629 | |

TABLE 3-continued

| i | R | d | Ni | Nh | Ng | vh | P | H |
|---|---|---|---|---|---|---|---|---|
| 24 | 53.357 | | | | | | | 0.64 |
| | | 4.657 | | | | | | |
| 25 | Stop | | | | | | | 0.01 |
| | | 73.674 | | | | | | |
| 26 | 92.740 | | | | | | | 10.32 |
| | | 5.614 | 1.636658 | 1.622941 | 1.615298 | 29.2 | 0.642 | |
| 27 | −104.161 | | | | | | | 10.51 |
| | | 4.724 | | | | | | |
| 28 | −66.176 | | | | | | | 10.53 |
| | | 2.925 | 1.504063 | 1.498983 | 1.495964 | 61.6 | 0.627 | |
| 29 | 54.198 | | | | | | | 10.80 |
| | | 11.990 | | | | | | |
| 30 | −42.826 | | | | | | | 12.53 |
| | | 3.087 | 1.504063 | 1.498983 | 1.495964 | 61.6 | 0.627 | |
| 31 | −181.634 | | | | | | | 13.55 |
| | | 68.421 | | | | | | |
| 32 | 537.808 | | | | | | | 35.37 |
| | | 11.036 | 1.511760 | 1.507205 | 1.504507 | 69.9 | 0.628 | |
| 33 | −117.093 | | | | | | | 36.10 |
| | | 0.871 | | | | | | |
| 34 | −466.904 | | | | | | | 36.64 |
| | | 4.527 | 1.636658 | 1.622941 | 1.615298 | 29.2 | 0.64 | |
| 35 | 232.981 | | | | | | | 37.49 |
| | | 6.170 | | | | | | |
| 36 | 656.500 | | | | | | | 38.63 |
| | | 11.433 | 1.511760 | 1.507205 | 1.504507 | 69.9 | 0.628 | |
| 37 | −124.549 | | | | | | | 39.23 |
| | | 1.027 | | | | | | |
| 38 | 1832.967 | | | | | | | 39.73 |
| | | 7.298 | 1.636658 | 1.622941 | 1.615298 | 29.2 | 0.642 | |
| 39 | −500.318 | | | | | | | 39.90 |
| | | 107.622 | | | | | | |
| 40 | Object or Image plane | | | | | | | 40.00 |

Figure 4:
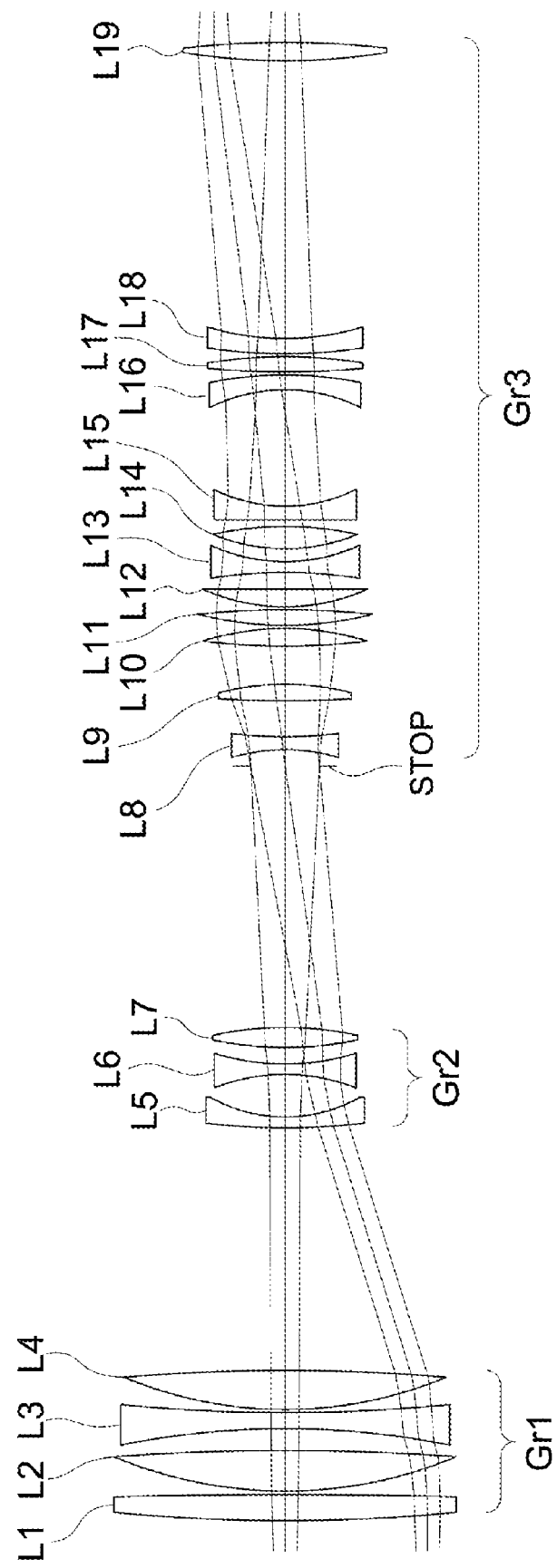
FIG. 4 is a cross sectional view showing a structure of a double-telecentric projection optical system of Example 2.

FIG. 4 is a cross sectional view showing a structure of the double-telecentric projection optical system of Example 2.

As shown in FIG. 4, the projection optical system of Example 2 has a 19-element structure. In Table 3, lens surfaces numbered 39 and 38 as surface number i represent the first lens L1 arranged at the closest position to the enlargement side. Lens surfaces numbered 2 and 1 as surface number i represent the nineteenth lens L19 arranged at the closest position to the reducing side.

In Example 2, the maximum image height Y at the enlargement side is 40.00. A first negative lens to satisfy |Hn/Y|<0.75 from the enlargement side in the projection optical lens is the fifth lens L5. Distance L1a from an apex of the enlargement-side surface of the first lens L1 to the surface of the stop is 212.798. A first lens to satisfy Ln/L1a>0.15 from the enlargement side among lenses from the fifth lens L5 to the lens closest to the reducing side, is the seventh lens L7.

In other words, as shown in FIG. 4, there are arranged, in order from the enlargement side to the reducing side, first lens group including the first lens L1 through the fourth lens L4, second lens group Gr2 including the fifth lens L5 through the seventh lens L7, and third lens group Gr3 including stop through the nineteenth lens L19.

In third group Gr3, positive lenses satisfying 0.662<0.00055×vh+P are five lenses of the ninth lens L9, the tenth lens L10, the eleventh lens L11, the twelfth lens L12, and the fourteenth lens L14.

Table 4 shows values of $Hn_{min}$ and $Hn_{min}/Y$ of the ninth lens L9, the tenth lens L10, the eleventh lens L11, the twelfth lens L12, and the fourteenth lens L14 which are positive lenses satisfying 0.662<0.00055×vh+P in third group Gr3 of Example 2.

TABLE 4

| | $Hn_{min}$ | $Hn_{min}/Y$ |
|---|---|---|
| Ninth lens | 2.52 | 0.0630 |
| Tenth lens | 4.36 | 0.1090 |
| Eleventh lens | 4.85 | 0.1213 |
| Twelfth lens | 5.10 | 0.1275 |
| Fourteenth lens | 5.66 | 0.1415 |

As can be seen from Table 4, these lenses satisfy the expression (5): $|Hn_{min}/Y|<0.3$.

Figure 5A:
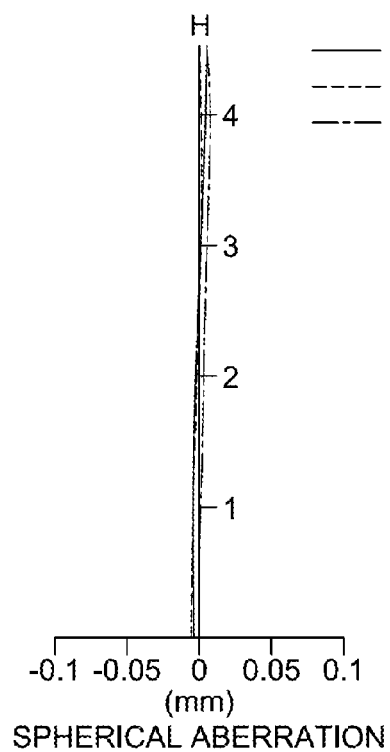
FIGS. 5a to 5d are drawings showing spherical aberration and astigmatism of the projection optical system of Example 2.
Figure 5B:
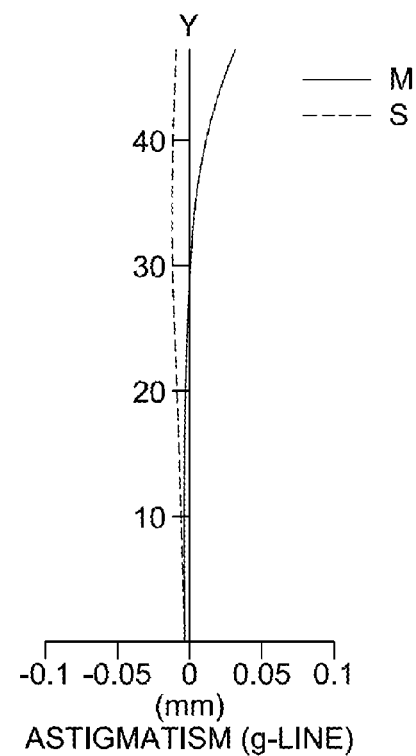
Figure 5C:
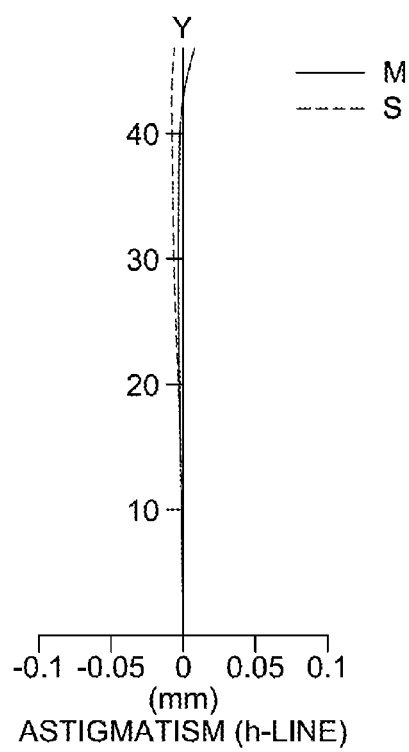
Figure 5D:
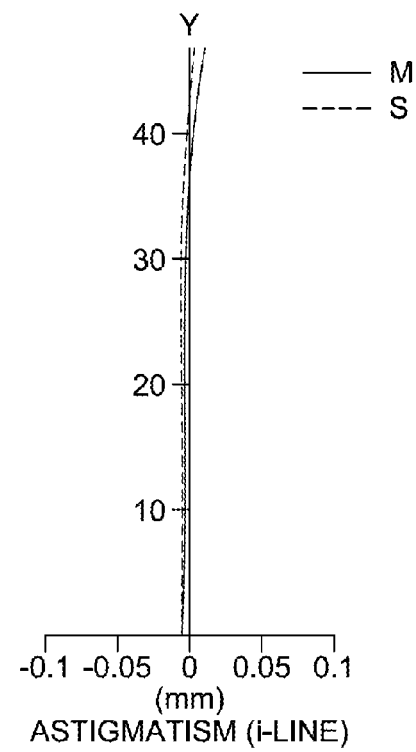

FIGS. 5a to 5d are drawings showing spherical aberration and astigmatism of the projection optical system of Example 2. In FIG. 5a, a solid line represents spherical aberration at g-line is, a dashed line represents spherical aberration at i-line, and an alternate long and short dash line represents spherical aberration at h-line. FIG. 5b shows astigmatism at g-line, FIG. 5c shows astigmatism at h-line, and FIG. 5d shows astigmatism at i-line. In the astigmatism diagrams, a solid line represents astigmatism on a meridional image plane, and a dashed line represents astigmatism on a saggital image plane.

Figure 6A:
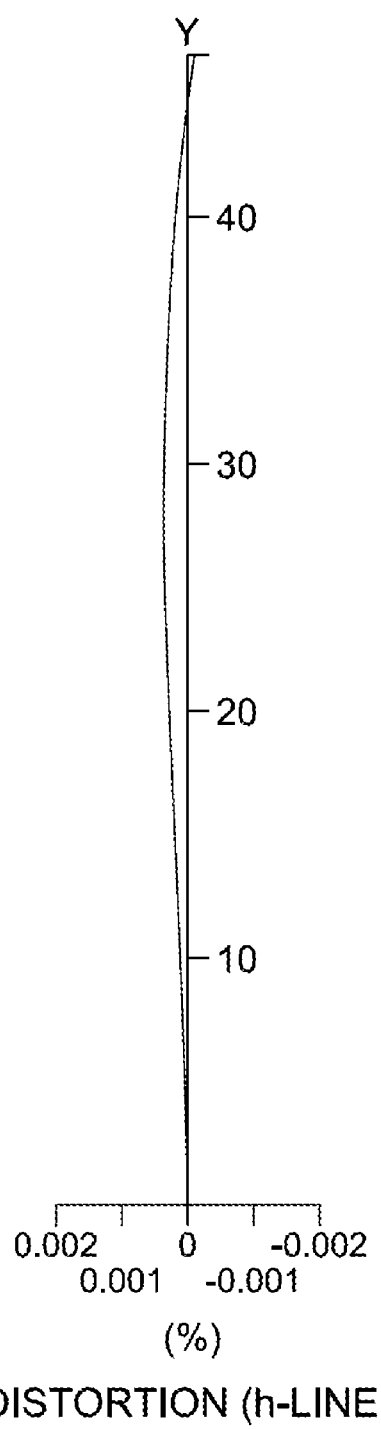
FIGS. 6a and 6b are drawings showing distortion and chromatic aberration of magnification of the projection optical system of Example 2.
Figure 6B:
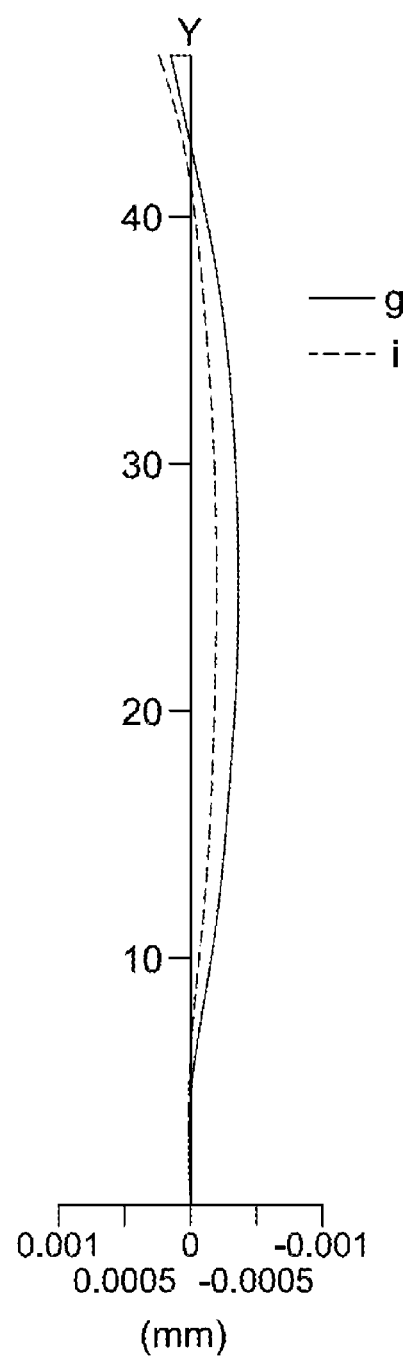

FIGS. 6a and 6b are drawings showing distortion and chromatic aberration of magnification of the projection optical system of Example 2. FIG. 6a shows distortion at h-line. In the diagram showing chromatic aberration of magnification, a solid line represents the chromatic aberration at g-line, and a dashed line represents the chromatic aberration at i-line.

Example 3

Example 3 will be described below.
Table 3 shows surface data of the projection optical system of Example 3.

third lens L3. Distance L1a from an apex of the enlargement-side surface of the first lens L1 to the surface of the stop is 116.676. A first lens to satisfy Ln/L1a>0.15 from the enlargement side among lenses from the third lens L3 to the lens closest to the reducing side, is the third lens L3.

TABLE 5

| i | R | d | Ni | Nh | Ng | vh | P | H |
|---|---|---|---|---|---|---|---|---|
| 0 | Object or Image plane | | | | | | | |
| | | 64.000 | | | | | | |
| 1 | 76.927 | | | | | | | 6.67 |
| | | 4.206 | 1.511760 | 1.507205 | 1.504507 | 69.9 | 0.628 | |
| 2 | −67.734 | | | | | | | 6.56 |
| | | 1.187 | | | | | | |
| 3 | 101.948 | | | | | | | 6.40 |
| | | 3.499 | 1.607243 | 1.599721 | 1.595297 | 50.2 | 0.630 | |
| 4 | 29.703 | | | | | | | 6.08 |
| | | 2.475 | | | | | | |
| 5 | 22.475 | | | | | | | 6.06 |
| | | 5.126 | 1.449860 | 1.446451 | 1.444423 | 82.1 | 0.627 | |
| 6 | −89.735 | | | | | | | 5.68 |
| | | 4.363 | | | | | | |
| 7 | −32.612 | | | | | | | 5.01 |
| | | 3.042 | 1.607243 | 1.599721 | 1.595297 | 50.2 | 0.630 | |
| 8 | 32.076 | | | | | | | 4.86 |
| | | 3.213 | | | | | | |
| 9 | 32.210 | | | | | | | 4.95 |
| | | 4.673 | 1.449860 | 1.446451 | 1.444423 | 82.1 | 0.627 | |
| 10 | −37.667 | | | | | | | 4.84 |
| | | 3.297 | | | | | | |
| 11 | 21.482 | | | | | | | 4.43 |
| | | 5.607 | 1.449860 | 1.446451 | 1.444423 | 82.1 | 0.627 | |
| 12 | −266.587 | | | | | | | 3.74 |
| | | 2.397 | | | | | | |
| 13 | 30.000 | | | | | | | 3.21 |
| | | 3.914 | 1.449860 | 1.446451 | 1.444423 | 82.1 | 0.627 | |
| 14 | 98.222 | | | | | | | 2.56 |
| | | 4.441 | | | | | | |
| 15 | −23.554 | | | | | | | 1.50 |
| | | 1.971 | 1.607243 | 1.599721 | 1.595297 | 50.2 | 0.630 | |
| 16 | 20.293 | | | | | | | 1.25 |
| | | 7.374 | | | | | | |
| 17 | Stop | | | | | | | 0.07 |
| | | 16.966 | | | | | | |
| 18 | 102.855 | | | | | | | 2.66 |
| | | 3.425 | 1.636137 | 1.622592 | 1.615047 | 29.5 | 0.642 | |
| 19 | −46.494 | | | | | | | 2.95 |
| | | 25.172 | | | | | | |
| 20 | −20.007 | | | | | | | 5.48 |
| | | 2.641 | 1.636137 | 1.622592 | 1.615047 | 29.5 | 0.642 | |
| 21 | 99.268 | | | | | | | 6.10 |
| | | 30.651 | | | | | | |
| 22 | −100.605 | | | | | | | 15.79 |
| | | 5.600 | 1.511760 | 1.507205 | 1.504507 | 69.9 | 0.628 | |
| 23 | −33.715 | 5.600 | | | | | | 16.48 |
| | | 17.803 | | | | | | |
| 24 | 222.698 | | | | | | | 19.62 |
| | | 8.817 | 1.504063 | 1.498983 | 1.495964 | 61.6 | 0.627 | |
| 25 | −111.344 | | | | | | | 20.00 |
| | | 36.684 | | | | | | |
| 26 | Object or Image plane | | | | | | | 20.00 |

Figure 7:
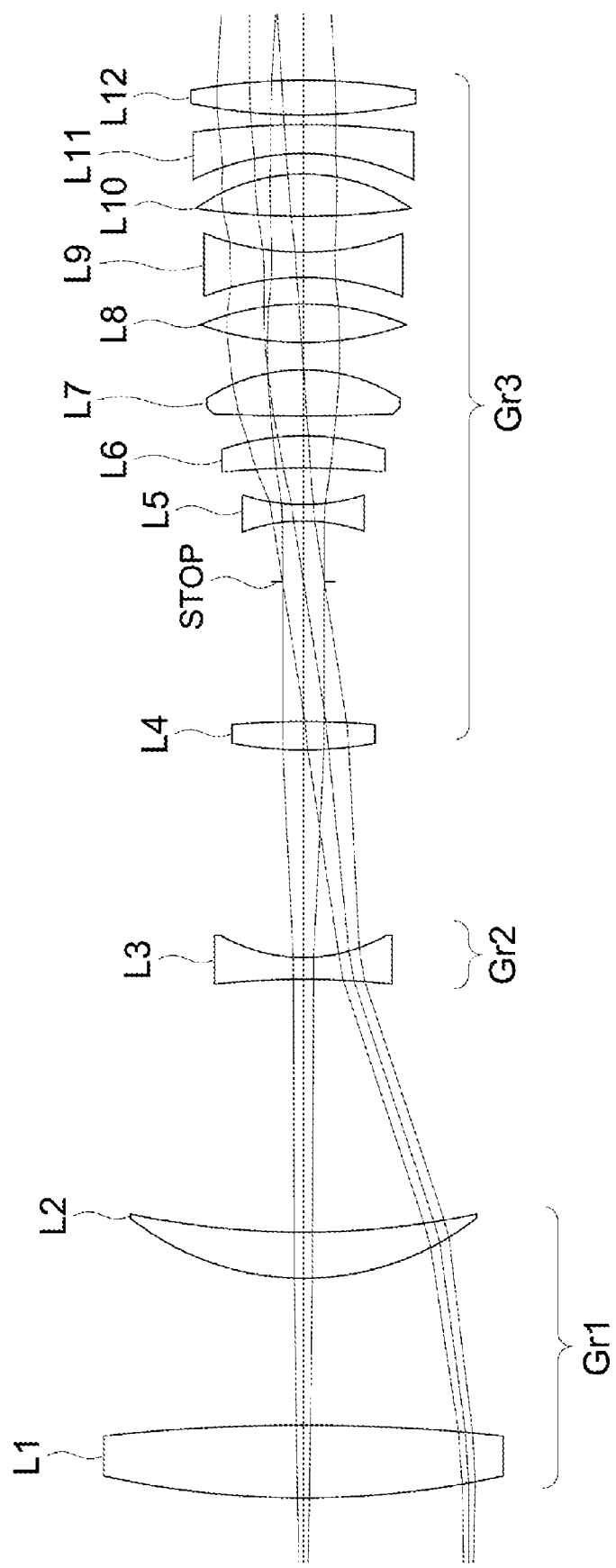
FIG. 7 is a cross sectional view showing a structure of a double-telecentric projection optical system of Example 3.

FIG. 7 is a cross sectional view showing a structure of the double-telecentric projection optical system of Example 3.

As shown in FIG. 7, the projection optical system of Example 3 has a 12-element structure. In Table 3, lens surfaces numbered 25 and 24 as surface number i represent the first lens L1 arranged at the closest position to the enlargement side. Lens surfaces numbered 2 and 1 as surface number i represent the twelfth lens L12 arranged at the closest position to the reducing side.

In Example 3, the maximum image height Y at the enlargement side is 20.00. A first negative lens to satisfy |Hn/Y|<0.75 from the enlargement side in the projection optical lens is the In other words, as shown in FIG. 7, there are arranged, in order from the enlargement side to the reducing side, first lens group including the first lens L1 through the second lens L2, second lens group Gr2 including just the third lens L3, and third lens group Gr3 including the fourth lens L4 through the twelfth lens L12.

In third group Gr3, positive lenses satisfying 0.662<0.00055×vh+P are five lenses of the sixth lens L6, the seventh lens L7, the eighth lens L8, the tenth lens L10, and the twelfth lens L12.

Table 4 shows values of $Hn_{min}$ and $Hn_{min}/Y$ of the sixth lens L6, the seventh lens L7, the eighth lens L8, the tenth lens L10, and the twelfth lens L12 which are positive lenses satisfying 0.662<0.00055×vh+P in third group Gr3 of Example 3.

TABLE 6

|  | $Hn_{min}$ | $Hn_{min}/Y$ |
|---|---|---|
| Sixth lens | 2.56 | 0.1280 |
| Seventh lens | 3.74 | 0.1870 |
| Eighth lens | 4.84 | 0.2420 |
| Tenth lens | 5.68 | 0.2840 |
| Twelfth lens | 6.56 | 0.3280 |

As can be seen from Table 6, four lenses of the sixth lens L6, the seventh lens L7, the eighth lens L8, and the tenth lens L10 satisfy the expression (5): $|Hn_{min}/Y|<0.3$.

Figure 8A:
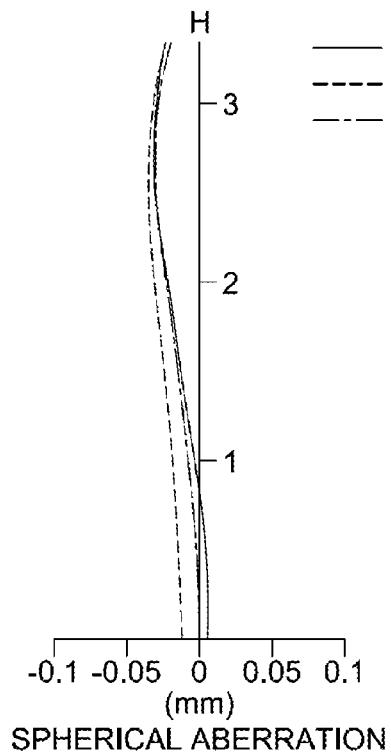
FIGS. 8a to 8d are drawings showing spherical aberration and astigmatism of the projection optical system of Example 3.
Figure 8B:
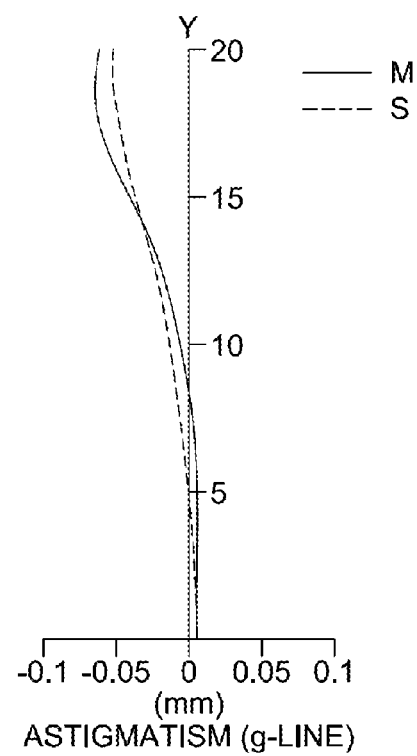
Figure 8C:
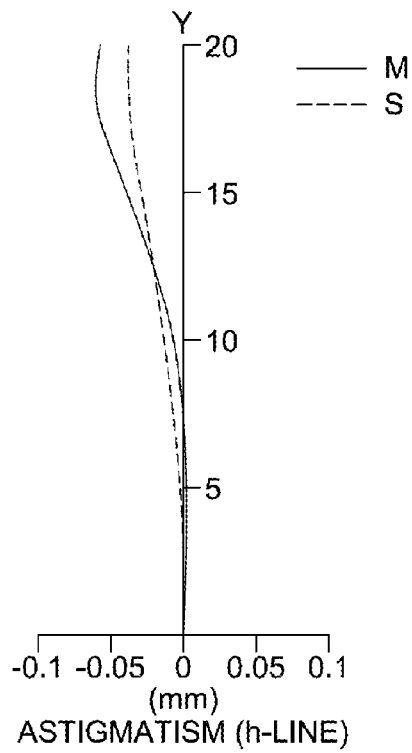
Figure 8D:
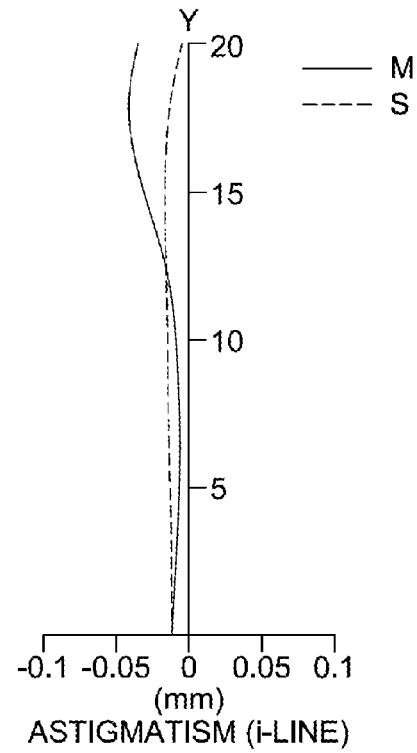

FIGS. 8a to 8d are drawings showing spherical aberration and astigmatism of the projection optical system of Example 3. In FIG. 8a, a solid line represents spherical aberration at g-line is, a dashed line represents spherical aberration at i-line, and an alternate long and short dash line represents spherical aberration at h-line. FIG. 8b shows astigmatism at g-line, FIG. 8c shows astigmatism at h-line, and FIG. 8d shows astigmatism at i-line. In the astigmatism diagrams, a solid line represents astigmatism on a meridional image plane, and a dashed line represents astigmatism on a saggital image plane.

Figure 9A:
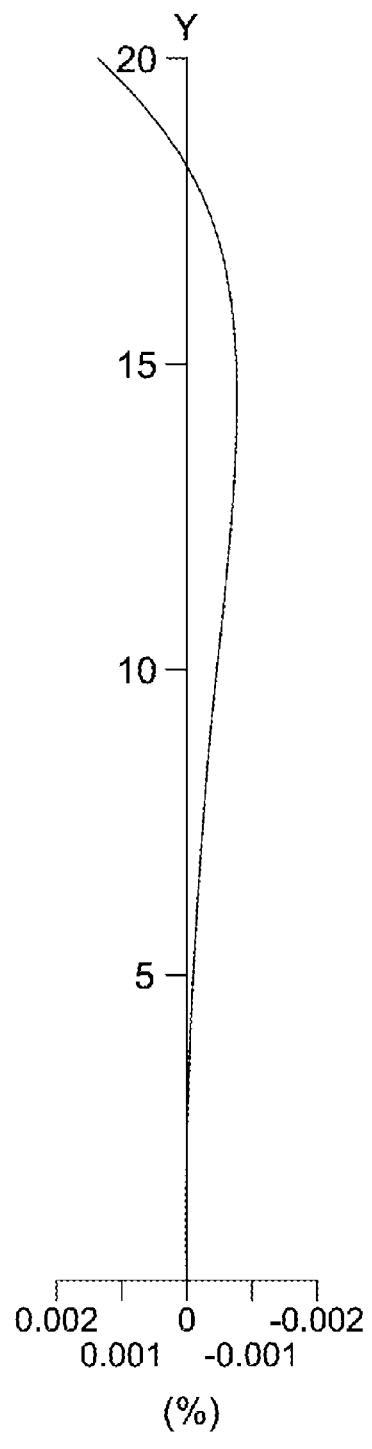
FIGS. 9a and 9b are drawings showing distortion and chromatic aberration of magnification of the projection optical system of Example 3.
Figure 9B:
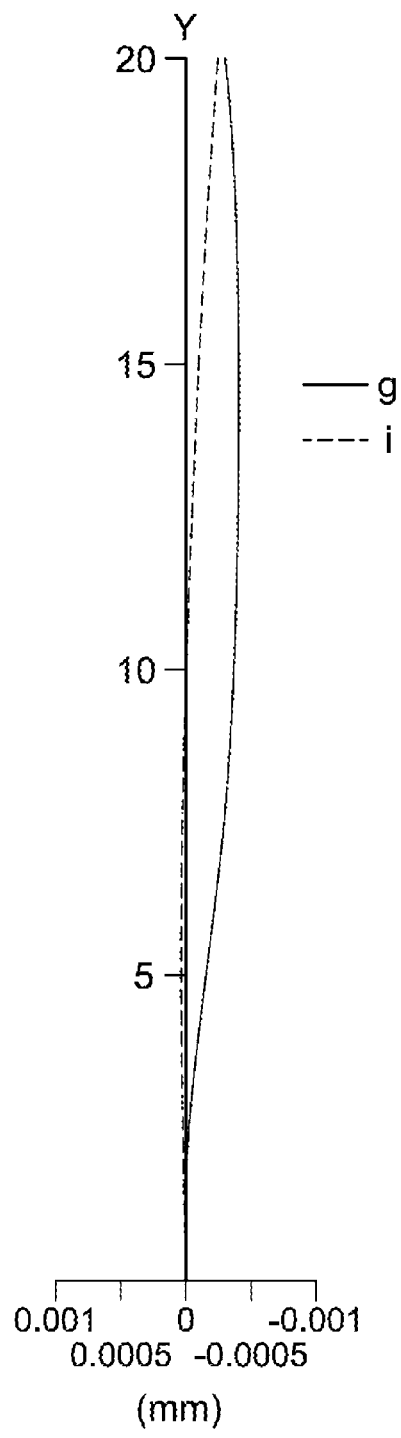

FIGS. 9a and 9b are drawings showing distortion and chromatic aberration of magnification of the projection optical system of Example 3. FIG. 9a shows distortion at h-line. In the diagram showing chromatic aberration of magnification, a solid line represents the chromatic aberration at g-line, and a dashed line represents the chromatic aberration at i-line.

Example 4

Example 4 will be described below.

Table 7 shows surface data of the projection optical system of Example 4.

TABLE 7

| i | R | d | Ni | Nh | Ng | vh | P | H |
|---|---|---|---|---|---|---|---|---|
| 0 | Object or Image plane | | | | | | | |
| | | 112.095 | | | | | | |
| 1 | −793.311 | | | | | | | 21.15 |
| | | 6.563 | 1.636658 | 1.622941 | 1.615298 | 29.2 | 0.642 | |
| 2 | −165.667 | | | | | | | 21.21 |
| | | 26.525 | | | | | | |
| 3 | 151.259 | | | | | | | 19.34 |
| | | 8.772 | 1.666450 | 1.650811 | 1.642171 | 26.8 | 0.644 | |
| 4 | −306.210 | | | | | | | 18.72 |
| | | 23.524 | | | | | | |
| 5 | −226.630 | | | | | | | 14.19 |
| | | 5.463 | 1.580215 | 1.572874 | 1.568579 | 49.2 | 0.631 | |
| 6 | −1497.218 | | | | | | | 13.63 |
| | | 13.406 | | | | | | |
| 7 | 110.359 | | | | | | | 11.40 |
| | | 3.776 | 1.535939 | 1.529930 | 1.526387 | 55.5 | 0.629 | |
| 8 | 76.205 | | | | | | | 10.85 |
| | | 10.543 | | | | | | |
| 9 | −100.143 | | | | | | | 9.57 |
| | | 7.561 | 1.612806 | 1.605502 | 1.601204 | 52.2 | 0.630 | |
| 10 | −253.339 | | | | | | | 9.19 |
| | | 43.424 | | | | | | |
| 11 | −543.179 | | | | | | | 4.85 |
| | | 7.348 | 1.559693 | 1.550656 | 1.545503 | 38.8 | 0.637 | |
| 12 | 344.977 | | | | | | | 4.40 |
| | | 3.661 | | | | | | |
| 13 | 356.339 | | | | | | | 4.08 |
| | | 5.949 | 1.449860 | 1.446451 | 1.444423 | 82.1 | 0.627 | |
| 14 | −141.036 | | | | | | | 3.70 |
| | | 5.224 | | | | | | |
| 15 | −87.489 | | | | | | | 3.15 |
| | | 5.777 | 1.619384 | 1.606803 | 1.599765 | 30.9 | 0.641 | |
| 16 | 472.182 | | | | | | | 2.86 |
| | | 2.628 | | | | | | |
| 17 | 546.900 | | | | | | | 2.65 |
| | | 7.818 | 1.449860 | 1.446451 | 1.444423 | 82.1 | 0.627 | |
| 18 | −111.868 | | | | | | | 2.21 |
| | | 1.073 | | | | | | |
| 19 | 423.091 | | | | | | | 2.12 |
| | | 6.819 | 1.449860 | 1.446451 | 1.444423 | 82.1 | 0.627 | |
| 20 | −139.396 | | | | | | | 1.68 |
| | | 0.242 | | | | | | |
| 21 | 174.206 | | | | | | | 1.66 |
| | | 6.129 | 1.449860 | 1.446451 | 1.444423 | 82.1 | 0.627 | |
| 22 | −435.992 | | | | | | | 1.23 |
| | | 0.242 | | | | | | |
| 23 | 134.903 | | | | | | | 1.20 |
| | | 6.688 | 1.449860 | 1.446451 | 1.444423 | 82.1 | 0.627 | |
| 24 | −580.217 | | | | | | | 0.71 |
| | | 5.886 | | | | | | |
| 25 | Stop | | | | | | | 0.07 |
| | | 11.122 | | | | | | |

TABLE 7-continued

| i | R | d | Ni | Nh | Ng | vh | P | H |
|---|---|---|----|----|----|----|----|---|
| 26 | −331.959 | | | | | | | 1.13 |
| | | 2.991 | 1.580215 | 1.572874 | 1.568579 | 49.2 | 0.631 | |
| 27 | 123.445 | | | | | | | 1.33 |
| | | 134.723 | | | | | | |
| 28 | 174.752 | | | | | | | 17.08 |
| | | 6.620 | 1.666450 | 1.650811 | 1.642171 | 26.8 | 0.644 | |
| 29 | −5362.359 | | | | | | | 17.25 |
| | | 63.451 | | | | | | |
| 30 | −98.453 | | | | | | | 20.25 |
| | | 8.509 | 1.474480 | 1.469610 | 1.466690 | 60.3 | 0.625 | |
| 31 | 117.788 | | | | | | | 21.51 |
| | | 14.049 | | | | | | |
| 32 | −70.216 | | | | | | | 23.47 |
| | | 5.269 | 1.535939 | 1.529930 | 1.526387 | 55.5 | 0.629 | |
| 33 | −195.345 | | | | | | | 25.62 |
| | | 8.521 | | | | | | |
| 34 | −71.893 | | | | | | | 27.38 |
| | | 10.708 | 1.535939 | 1.529930 | 1.526387 | 55.5 | 0.629 | |
| 35 | −244.969 | | | | | | | 32.71 |
| | | 21.237 | | | | | | |
| 36 | −191.503 | | | | | | | 42.69 |
| | | 13.223 | 1.666450 | 1.650811 | 1.642171 | 26.8 | 0.644 | |
| 37 | −104.607 | | | | | | | 45.74 |
| | | 0.834 | | | | | | |
| 38 | 3565.595 | | | | | | | 49.91 |
| | | 20.872 | 1.535939 | 1.529930 | 1.526387 | 55.5 | 0.629 | |
| 39 | −153.927 | | | | | | | 52.39 |
| | | 0.242 | | | | | | |
| 40 | 337.037 | | | | | | | 54.42 |
| | | 19.260 | 1.512054 | 1.507470 | 1.504754 | 69.5 | 0.628 | |
| 41 | −469.965 | | | | | | | 54.88 |
| | | 167.827 | | | | | | |
| 42 | Object or Image plane | | | | | | | 55.00 |

FIG. 10 is a cross sectional view showing a structure of the double-telecentric projection optical system of Example 4.

As shown in FIG. 10, the projection optical system of Example 4 has a 20-element structure. In Table 7, lens surfaces numbered 41 and 40 as surface number i represent the first lens L1 arranged at the closest position to the enlargement side. Lens surfaces numbered 2 and 1 as surface number i represent the twentieth lens L20 arranged at the closest position to the reducing side.

In Example 4, the maximum image height Y at the enlargement side is 55.00. A first negative lens to satisfy |Hn/Y|<0.75 from the enlargement side in the projection optical lens is the fourth lens L4. Distance L1a from an apex of the enlargement-side surface of the first lens L1 to the surface of the stop is 341.632. A first lens to satisfy Ln/L1a>0.15 from the enlargement side among lenses from the fourth lens L4 to the lens closest to the reducing side, is the sixth lens L6.

In other words, as shown in FIG. 10, there are arranged, in order from the enlargement side to the reducing side, first lens group including the first lens L1 through the third lens L3, second lens group Gr2 including the fourth lens L4 through the sixth lens L6, and third lens group Gr3 including the seventh lens L7 through the twentieth lens L20.

In third group Gr3, positive lenses satisfying 0.662<0.00055×vh+P are five lenses of the ninth lens L9, the tenth lens L10, the eleventh lens L11, the twelfth lens L12, and the fourteenth lens L14.

Table 8 shows values of $Hn_{min}$ and $Hn_{min}/Y$ of the ninth lens L9, the tenth lens L10, the eleventh lens L11, the twelfth lens L12, and the fourteenth lens L14 which are positive lenses satisfying 0.662<0.00055×vh+P in third group Gr3 of Example 4.

TABLE 8

| | $Hn_{min}$ | $Hn_{min}/Y$ |
|---|---|---|
| Ninth lens | 0.71 | 0.0129 |
| Tenth lens | 1.23 | 0.0224 |
| Eleventh lens | 1.68 | 0.0305 |
| Twelfth lens | 2.21 | 0.0402 |
| Fourteenth lens | 3.70 | 0.0673 |

As can be seen from Table 8, these lenses satisfy the expression (5): $|Hn_{min}/Y|<0.3$.

Figure 11A:
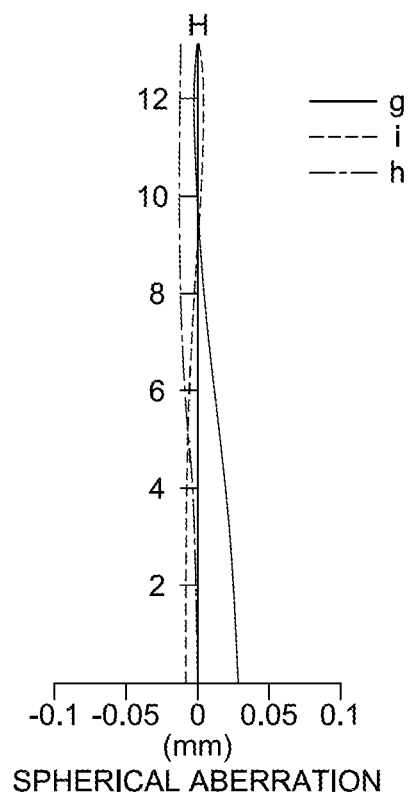
FIGS. 11a to 11d are drawings showing spherical aberration and astigmatism of the projection optical system of Example 4.
Figure 11B:
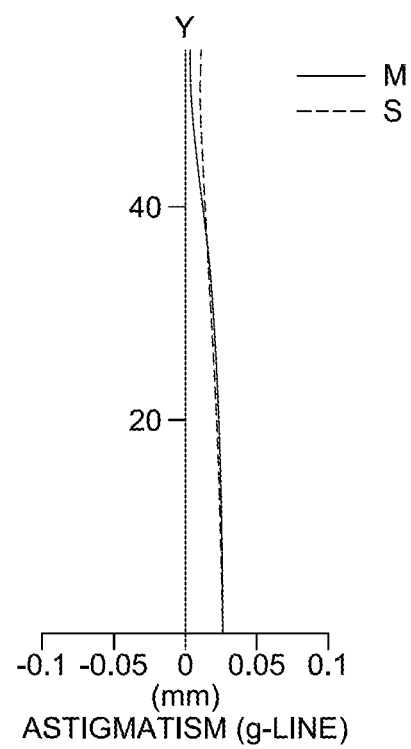
Figure 11C:
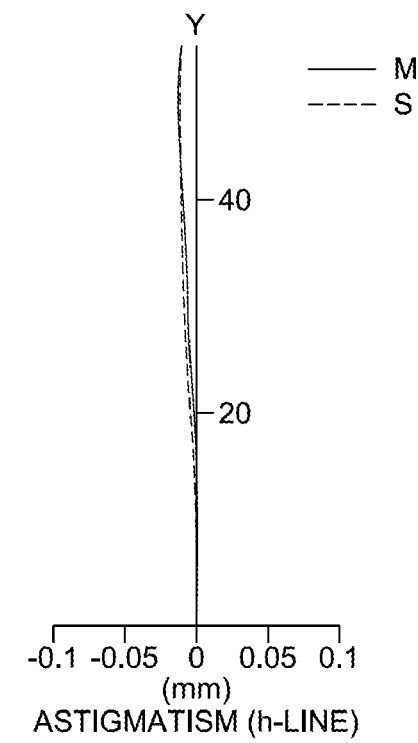
Figure 11D:
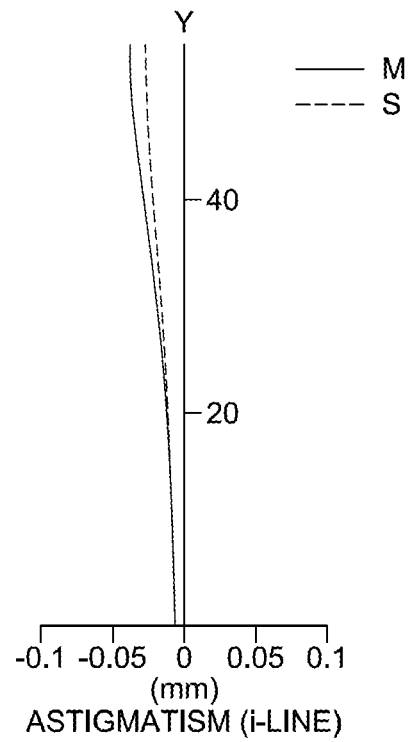

FIGS. 11a to 11d are drawings showing spherical aberration and astigmatism of the projection optical system of Example 4. In FIG. 11a, a solid line represents spherical aberration at g-line is, a dashed line represents spherical aberration at i-line, and an alternate long and short dash line represents spherical aberration at h-line. FIG. 11b shows astigmatism at g-line, FIG. 11c shows astigmatism at h-line, and FIG. 11d shows astigmatism at i-line. In the astigmatism diagrams, a solid line represents astigmatism on a meridional image plane, and a dashed line represents astigmatism on a saggital image plane.

Figure 12A:
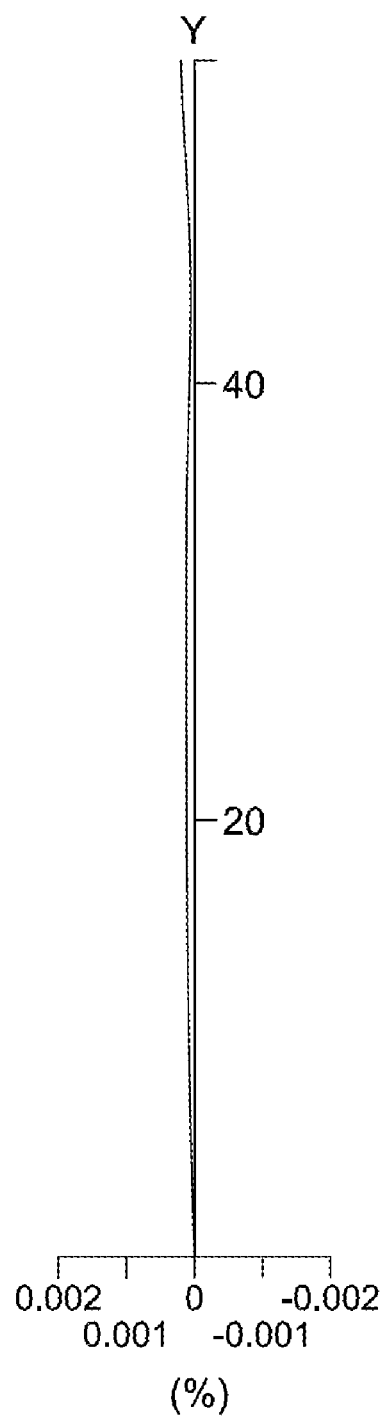
FIGS. 12a and 12b are drawings showing distortion and chromatic aberration of magnification of the projection optical system of Example 4.
Figure 12B:
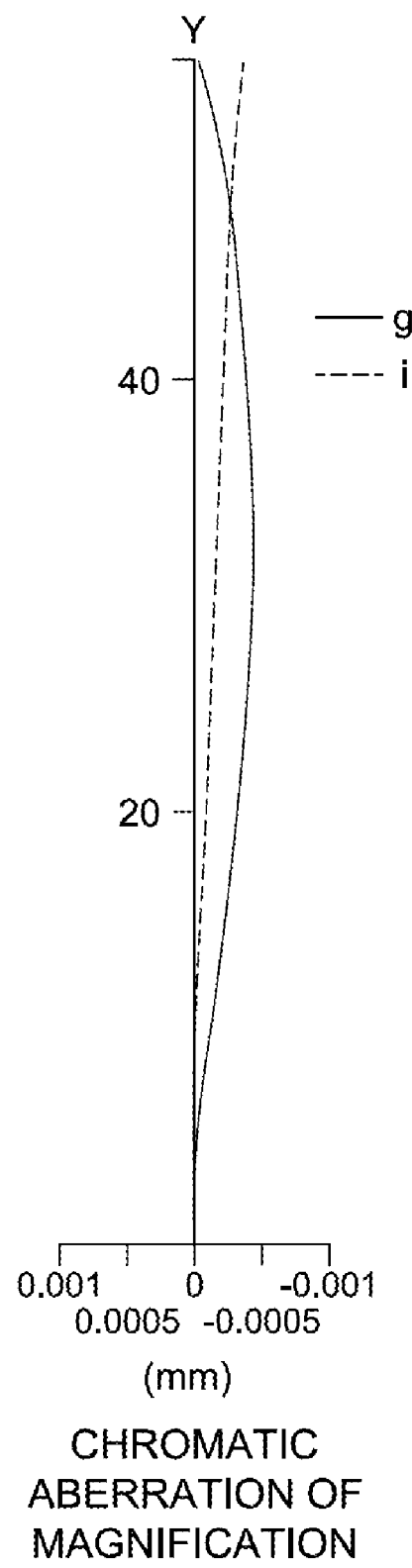

FIGS. 12a and 12b are drawings showing distortion and chromatic aberration of magnification of the projection optical system of Example 4. FIG. 6a shows distortion at h-line. In the diagram showing chromatic aberration of magnification, a solid line represents the chromatic aberration at g-line, and a dashed line represents the chromatic aberration at i-line.

Table 9 shows parameters of the projection optical systems and values of expressions (1) to (4), and (6), of Examples 1 to 4.

TABLE 9

| Parameter or Expression | Example 1 | Example 2 | Example 3 | Example 4 |
|---|---|---|---|---|
| Magnification | −2.0 | −2.0 | −3.0 | −2.6 |
| NA | 0.020 | 0.033 | 0.020 | 0.050 |
| Maximum image height at the enlargement side Y | 30.00 | 40.00 | 20.00 | 55.00 |
| f3 | 150.55 | 147.17 | 63.77 | 404.31 |
| f2 | −43.74 | −91.02 | −26.52 | −47.95 |
| f1 | 116.10 | 134.91 | 64.18 | 111.75 |
| f12 | 317.62 | 293.21 | 205.21 | 1634.71 |
| Expression (1) |f12/f3| | 2.11 | 2.05 | 3.22 | 4.04 |
| Expression (2) |f1/f12| | 0.37 | 0.46 | 0.31 | 0.07 |
| Expression (3) |f2/f12| | 0.14 | 0.31 | 0.13 | 0.03 |
| Expression (4) |f2/f1| | 0.38 | 0.67 | 0.41 | 0.43 |
| L1a | 180.975 | 212.798 | 116.676 | 341.632 |
| TL | 315.222 | 417.023 | 177.463 | 556.672 |
| LB | 51.490 | 66.200 | 64.000 | 112.095 |
| Expression (6) LB/TL | 0.163 | 0.159 | 0.361 | 0.201 |

Table 9 shows that the projection optical systems of Examples 1 to 4 satisfy all the expressions (1) to (4), and (6).

As can be seen from the above Examples, embodiments of the present invention can provide a double telecentric projection optical lens which maintains image forming property in an excellent condition, and is achromatized for plural wavelength bands within a range from the visible range to near ultraviolet range.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A projection optical system with a double telecentricity comprising, in order from a enlargement side:

a first lens group with a positive power, including a first lens arranged at a closest position to the enlargement side in the projection optical system;

a second lens group with a negative power, including a lens or lenses which start with a negative lens that is a first negative lens to satisfy |Hn/Y|<0.75 from the enlargement side in the projection optical system, and which end with a lens that is the first to satisfy Ln/L1a>0.15 from the enlargement side among the negative lens and lenses at the rear of the negative lens in the projection optical system; and a third lens group with a positive power, including a stop and lenses at the rear of the second lens group, where the lenses in the third lens group include at least two positive lenses satisfying 0.662<0.00055×vh+P, wherein the projection optical system uses a plurality of wavelengths or a wavelength band covering a predetermined range each of which is within a wavelength range from a visible region to a near ultraviolet region, and the projection optical system satisfies the following expression:

$$1 < |f12/f3| < 5,$$

where Hn is a height (mm) of an outermost off-axis principal ray, measured from an optical axis when the outermost off-axis principal ray passes through an enlargement-side surface of an n-th lens, Y is a maximum image height (mm) at the enlargement side, Ln is a distance of an air space between an n-th lens and an (n+1)-th lens, L1a is a distance from an apex of an enlargement-side surface of the first lens to a surface of the stop, vh is defined as (Nh−1)/(Ni−Ng), P is defined as P=(Ni−Nh)/(Ni−Ng), Nh is a refractive index at h-line, Ni is a refractive index at i-line, Ng is a refractive index at g-line, f12 is a composite focal length (mm) of the first lens group and the second lens group, and f3 is a focal length (mm) of the third lens group, where each of the n-th lens for Hn and Ln is an n-th lens to be arranged from the enlargement side in the projection optical system and each n is independently an integer of one or more.

2. The projection optical system of claim 1, wherein the projection optical system satisfies $$0.04 < |f1/f12| < 0.6,$$

where f1 is a focal length of the first lens group.

3. The projection optical system of claim 2, wherein the projection optical system satisfies $$0.1 < LB/TL < 0.5,$$

where LB is a backside length of the projection optical system at a reduction side and TL is a total length of the projection optical system.

4. The projection optical system of claim 2, wherein the projection optical system satisfies $$0.01 < |f2/f12| < 0.5,$$

where f2 is a focal length of the second lens group.

5. The projection optical system of claim 4, wherein the projection optical system satisfies $$0.25 < |f2/f1| < 0.8.$$

6. The projection optical system of claim 5, wherein each of the at least two positive lenses satisfying 0.662<0.00055×vh+P in the third lens group satisfies the following expression:

$$|Hn_{min}/Y| < 0.3,$$

where $Hn_{min}$ is smaller one (mm) of a height of an outermost off-axis principal ray measured when the outermost off-axis principal ray passes through an enlargement-side surface of each of the at least two positive lenses and a height of an outermost off-axis principal ray measured when the outermost off-axis principal ray passes a reduction-side surface of each of the at least two positive lenses.

7. The projection optical system of claim 6, wherein the projection optical system satisfies $$0.1 < LB/TL < 0.5,$$

where LB is a backside length of the projection optical system at a reduction side and TL is a total length of the projection optical system.

8. The projection optical system of claim 1, wherein the projection optical system satisfies $$0.01 < |f2/f12| < 0.5,$$

where f2 is a focal length of the second lens group.

9. The projection optical system of claim 8, wherein the projection optical system satisfies $$0.25 < |f2/f1| < 0.8.$$

10. The projection optical system of claim 1, wherein the projection optical system satisfies $$0.25 < |f2/f1| < 0.8.$$

11. The projection optical system of claim 10,
wherein each of the at least two positive lenses satisfying 0.662<0.00055×vh+P in the third lens group satisfies the following expression:

$$|Hn_{min}/Y|<0.3,$$

where $Hn_{min}$ is smaller one (mm) of a height of an outermost off-axis principal ray measured when the outermost off-axis principal ray passes through an enlargement-side surface of each of the at least two positive lenses and a height of an outermost off-axis principal ray measured when the outermost off-axis principal ray passes a reduction-side surface of each of the at least two positive lenses.

12. The projection optical system of claim 1,
wherein each of the at least two positive lenses satisfying 0.662<0.00055×vh+P in the third lens group satisfies the following expression:

$$|Hn_{min}/Y|<0.3,$$

where $Hn_{min}$ is smaller one (mm) of a height of an outermost off-axis principal ray measured when the outermost off-axis principal ray passes through an enlargement-side surface of each of the at least two positive lenses and a height of an outermost off-axis principal ray measured when the outermost off-axis principal ray passes a reduction-side surface of each of the at least two positive lenses.

13. The projection optical system of claim 1,
wherein the third lens group includes at least three positive lenses and at least two negative lenses.

14. The projection optical system of claim 13,
wherein the first lens arranged at the closest position to the enlargement side in the first lens group, is a biconvex positive lens.

15. The projection optical system of claim 14,
wherein the first lens group includes at least two positive lenses.

16. The projection optical system of claim 15,
wherein the first lens group includes a positive lens, a negative lens, and a positive lens, in order from the enlargement side.

17. The projection optical system of claim 1,
wherein the first lens arranged at the closest position to the enlargement side in the first lens group, is a biconvex positive lens.

18. The projection optical system of claim 1,
wherein the first lens group includes at least two positive lenses.

19. The projection optical system of claim 18,
wherein the first lens group includes a positive lens, a negative lens, and a positive lens, in order from the enlargement side.

20. The projection optical system of claim 1,
wherein the projection optical system satisfies $$0.1<LB/TL<0.5,$$

where LB is a backside length of the projection optical system at a reduction side and
TL is a total length of the projection optical system.

* * * * *